(12) United States Patent
Gakhar (10) Patent No.: US 10,417,211 B2
(45) Date of Patent: Sep. 17, 2019

(54) QUICK HARDWARE INVENTORY OF A SOFTWARE-DEFINED DATA CENTER (SDDC) MULTI-RACK

(71) Applicant: VMWARE, INC., Palo Alto, CA (US)

(72) Inventor: Suket Gakhar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 262 days.

(21) Appl. No.: 15/404,209

(22) Filed: Jan. 12, 2017

(65) Prior Publication Data

US 2018/0089189 A1 Mar. 29, 2018

(30) Foreign Application Priority Data

Sep. 29, 2016 (IN) .............................. 201641033345

(51) Int. Cl.
*G06F 16/00* (2019.01)
*G06F 16/22* (2019.01)
*H04L 29/08* (2006.01)

(52) U.S. Cl.
CPC ...... *G06F 16/2255* (2019.01); *H04L 67/1097* (2013.01); *H04L 67/12* (2013.01); *H04L 67/16* (2013.01); *H04L 67/2842* (2013.01)

(58) Field of Classification Search
CPC ............ G06F 17/3033; G06F 16/2255; H04N 67/1097; H04N 67/16; H04N 67/12; H04N 67/2842
USPC .......................................................... 707/747
See application file for complete search history.

(56) References Cited

U.S. PATENT DOCUMENTS

| | | | |
|---|---|---|---|
| 8,724,848 B1 * | 5/2014 | Heath | G01S 5/16 348/169 |
| 9,553,771 B1 | 1/2017 | McKenna et al. | |
| 9,929,780 B2 * | 3/2018 | Abbondanzio | H04B 5/0056 |
| 10,083,051 B1 | 9/2018 | Mahapatra et al. | |
| 2006/0184349 A1 | 8/2006 | Goud et al. | |
| 2007/0143629 A1 * | 6/2007 | Hardjono | H04L 63/0823 713/189 |
| 2008/0271034 A1 | 10/2008 | Miyata | |
| 2008/0275975 A1 | 11/2008 | Pandey et al. | |
| 2010/0101339 A1 | 4/2010 | Tatsutani et al. | |
| 2011/0055588 A1 | 3/2011 | Dehaan | |
| 2011/0298607 A1 | 12/2011 | Priyantha et al. | |
| 2013/0223684 A1 * | 8/2013 | Townend | G06Q 10/08 382/103 |
| 2014/0055248 A1 | 2/2014 | Hammelbacher | |
| 2014/0298091 A1 | 10/2014 | Carlen et al. | |
| 2015/0009013 A1 | 1/2015 | Cartwright et al. | |

(Continued)

*Primary Examiner* — Vincent F Boccio (57) ABSTRACT

A quick hardware inventory of a software-defined data center (SDDC) multi-rack is created. A hardware management server (HMS) receives an imaging of a first rack and performs a node hash of attributes of the imaging of the first rack. A hash database is then checked for an inventory hash that matches the node hash of the first rack. If a match is found, a rack inventory is loaded from a persistent rack data inventory correlated with the inventory hash instead of the HMS performing a discovery and inventory of the first rack. In addition, a sensor error log of the first rack is checked for any errors and the rack inventory is modified based on any errors in the sensor error log. The rack inventory is then saved into the server switch object cache of the HMS. The steps are repeated by the HMS for each additional rack.

20 Claims, 5 Drawing Sheets

(56) References Cited

U.S. PATENT DOCUMENTS

2015/0098608 A1* 4/2015 Hintermeister .......... G06K 9/00
                                                        382/103
2016/0337446 A1* 11/2016 Abali .................. H04L 41/0816
2017/0255494 A1   9/2017 Bartfai-Walcott et al.
2017/0293447 A1  10/2017 Bivens et al.

* cited by examiner

QUICK HARDWARE INVENTORY OF A SOFTWARE-DEFINED DATA CENTER (SDDC) MULTI-RACK

RELATED APPLICATION

Benefit is claimed under 35 U.S.C. 119(a)-(d) to Foreign Application Serial No. 201641033345 filed in India entitled "QUICK HARDWARE INVENTORY OF A SOFTWARE-DEFINED DATA CENTER (SDDC) MULTI-RACK", filed on Sep. 29, 2016, by VMware, Inc., which is herein incorporated in its entirety by reference for all purposes

BACKGROUND

A software-defined data center (SDDC) is hardware agnostic and is designed to work with hardware from various different vendors. Applications on SDDC run on, logically defined resources for which hardware is abstracted away. Hardware Management System (HMS) is used to provide the hardware abstraction. HMS is responsible for inventory, discovery, monitoring, configuration and lifecycle management of individual server or switches.

Discovery and inventory of hardware is one of the key functions of HMS and is usually quite time consuming given the amount of data to be queried and parsed using out of band or in-band path. HMS is stateless and hence ends up doing a rack discovery and inventory every time it boots up. It usually it takes more than 1 minute to inventory a single host and around 2 minutes more to inventory a single switch. Each rack may have pluralities of both servers and switches.

In a multi-rack environment the discovery time problem can grow significantly worse when HMS has to collect a multi-rack inventory.

BRIEF DESCRIPTION OF THE DRAWING

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

DESCRIPTION OF EMBODIMENTS

Reference will now be made in detail to various embodiments of the subject matter, examples of which are illustrated in the accompanying drawings. While various embodiments are discussed herein, it will be understood that they are not intended to be limited to these embodiments. On the contrary, the presented embodiments are intended to cover alternatives, modifications and equivalents, which may be included within the spirit and scope of the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail so as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise, or as is apparent from the following discussions, it is appreciated that throughout the description of embodiments, discussions utilizing terms such as "displaying," "promoting," "integrating," "emphasizing," "providing," "monitoring," "determining," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview

SDDC is hardware agnostic and is designed to work with hardware from various different vendors. Applications on SDDC run on logically defined resources for which hardware is abstracted away. HMS is used to provide the hardware abstraction. HMS is responsible for inventory, discovery, monitoring, configuration and lifecycle management of individual server or switches. Discovery and inventory of hardware is one of the key functions of the HMS and is usually time consuming given the amount of data to be queried and parsed using out of band or in-band path. In general, HMS is stateless and hence ends up doing a rack discovery and inventory every time it boots up. Usually it takes more than 1 minute to inventory a single host and around 2 minutes more to inventory a single switch.

The following discussion provides a novel way of reducing the inventory time for one or more racks by the HMS. By utilizing aspects of the following discussion, the boot up time for the HMS will be significantly shorter while the accuracy of the HMS inventory of hardware will remain accurate and up to date. Thus, the state of a computer system is transformed at least by the utilization of the HMS restart quick discovery option.

In general, a quick hardware inventory of a software-defined data center (SDDC) multi-rack is created. The HMS receives an imaging of a first rack and performs a node hash of attributes of the imaging of the first rack. A hash database is then checked for an inventory hash that matches the node hash of the first rack. If a match is found, a rack inventory is loaded from a persistent rack data inventory correlated with the inventory hash instead of the HMS performing a discovery and inventory of the first rack. In addition, a sensor error log of the first rack is checked for any errors and the rack inventory is modified based on any errors in the sensor error log. The rack inventory is then saved into the server switch object cache of the HMS. The steps are repeated by the HMS for each additional rack.

Single Rack Inventory

Figure 1:
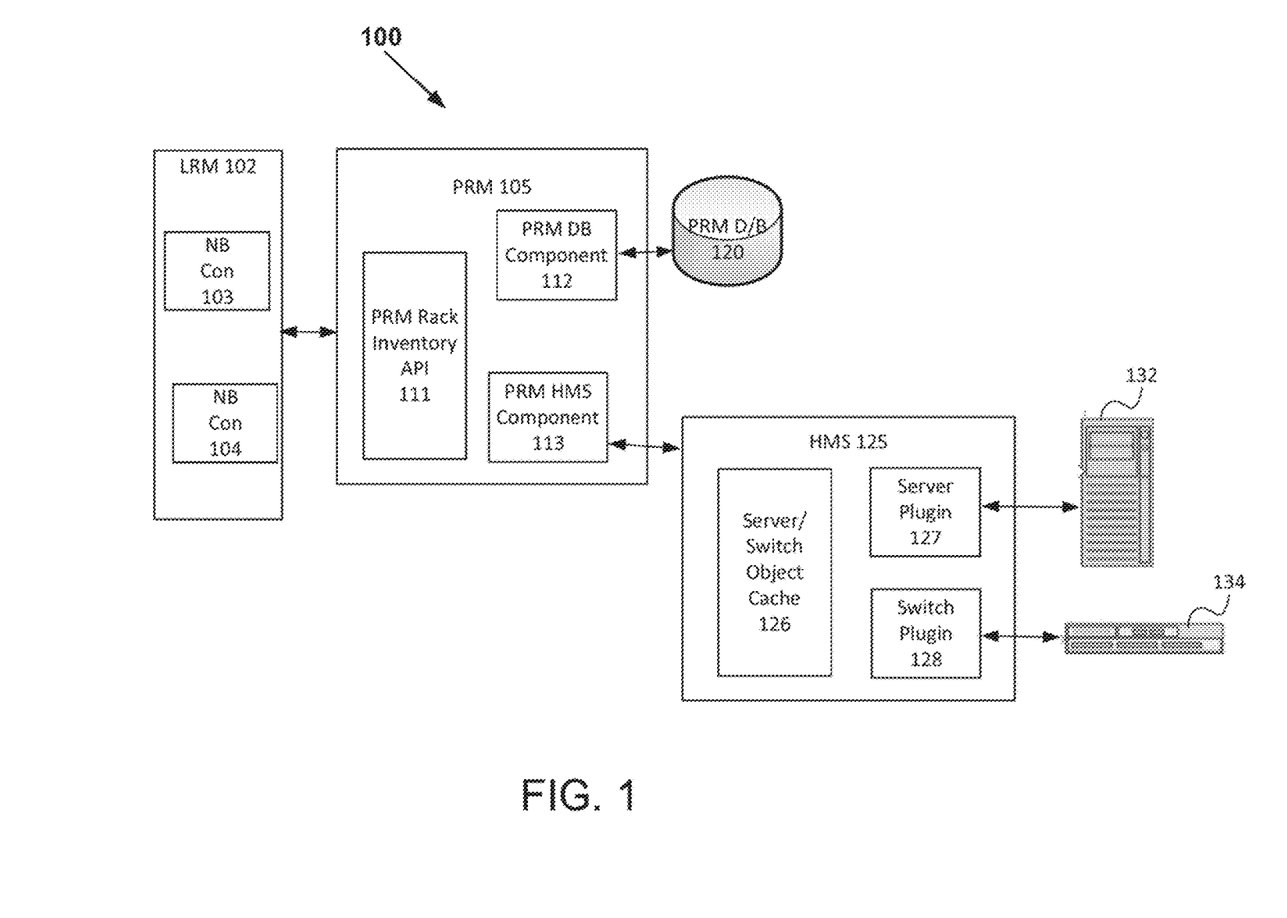
FIG. 1 depicts a block diagram of a SDDC rack, according to one embodiment.

With reference now to FIG. 1, a block diagram of a SDDC rack 100 is shown in accordance with an embodiment. In one embodiment, SDDC rack 100 is a combination of software and hardware that are stored on a rack. However, the technology is also suited to one or more components of SDDC rack 100 being stored in locations other than the rack. Moreover, although there are some specific organizations of SDDC rack 100 discussed herein and contained in the figures, the technology may be well suited to different arrangements, organization, or the like. In general, SDDC rack 100 utilizes the concepts of virtualization across all data center resources and services (compute, storage, and networking) to deliver a fully automated, zero-downtime infrastructure that can transparently include different hardware over time. SDDC rack 100 provides abstraction, pooling, and automation of the compute/storage/networking infrastructure services. Under SDDC rack 100, policy-driven automation will enable provisioning and ongoing management of both physical and logical compute, storage, and network services. In FIG. 1, SDDC rack 100 includes logical resource manager 102, physical resource manager (PRM) 105, PRM database 120, and HMS 125.

LRM 102 manages the logical resource state of SDDC rack 100. LRM 102 may utilize a number of NB consumers such as NB consumer 103 and 104.

PRM 105 manages the physical components of a physical rack and maintains a corresponding software physical rack object. In other words, PRM 105 monitors the hardware health of the switches and hosts and reports each one's health status. Thus the SDDC system calculates the hardware health state of the resource based on the current set of alerts that the PRM has raised for that hardware resource and the severities of those alerts, including any alerts on the hardware Field Replaceable Units (FRUs) contained within that resource. In one embodiment, PRM 105 includes a PRM rack inventory application program interface (API) 111, a PRM database component 112 and a PRM HMS component 113.

PRM rack inventory API 111 is a set of routines, protocols, and tools for building software applications. PRM rack inventory API 111 specifies how software components should interact and is used when programming graphical user interface (GUI) components. For example, a user interacts with LRM 102 to initialize and monitor PRM 105 and HMS 125. PRM rack inventory API 111 allows the user to utilize a GUI, on screen menus, command lines and the like to monitor, program, initiate, and adjust SDDC via the PRM 105.

In one embodiment, PRM database component 112 communicates with PRM database 120 to store information such as an inventory state of SDDC rack 100. PRM HMS component 113 communicates with HMS 125 to obtain the component and state information about SDDC rack 100. For example, PRM database may store information such as the status of server 132, the state of switch 134, and the like.

HMS 125 is a hardware abstraction layer that interfaces with the hardware components such as servers with direct attached storage (DAS), switches, power distribution units (PDUs), and other physical devices. It is responsible for discovery, inventory, monitoring, configuration, and lifecycle management of individual servers or switches. For example, HMS 125 automatically discovers new servers, bootstraps or resets them, and processes hardware events (e.g., alarms, sensor data threshold triggers) and state changes. HMS 125 then exposes events and state changes to the rest of the SDDC rack 100 in a hardware-independent manner. HMS 125 also supports rack-level boot-up sequencing of hardware components and provides services such as secure, remote, hard reset of these components. Thus, in one embodiment, HMS 125 is part of a dedicated management infrastructure running in each physical rack.

In FIG. 1, HMS 125 includes a server/switch object cache 126, a server plugin 127 and a switch plugin 128. In one embodiment, server/switch object cache 126 provides information about the components and state of components of the rack to PRM HMS component 113. For example, the status of switch 134, the state of server 132, and the like. Server plugin 127 provides a communication protocol to allow HMS 125 to communicate with different servers. For example, server plugin 127 will allow HMS 125 to communicate with servers running different operating systems, servers from different manufacturers, and the like. Similarly, switch plugin 128 provides a communication protocol to allow HMS 125 to communicate with different switches. For example, switch plugin 128 will allow HMS 125 to communicate with switches from different manufacturers, with different operating systems, and the like.

In general, server 132 may be any of a plurality of server types. One example of characteristics of server 132 is an Intel x86 based server that contains redundant, multi-gigabit network interfaces, power supplies, as well as a combination of hard drives and solid state drives. Similarly, switch 134 may be any of a number of switch types. For example, switch 134 may be a management switch, a top of rack (TOR) switch, spine switch, or the like. Although in FIG. 1, only a single server 132 and a single switch 134 are shown, it should be appreciated that one embodiment of a full rack may include 20 nodes which may include a plurality of servers, a plurality of switches, a number of other components, and the like. Thus, the use of a single switch 134 and single server 132 is provided in the diagram and used in the discussion merely for purposes of clarity.

Figure 2:
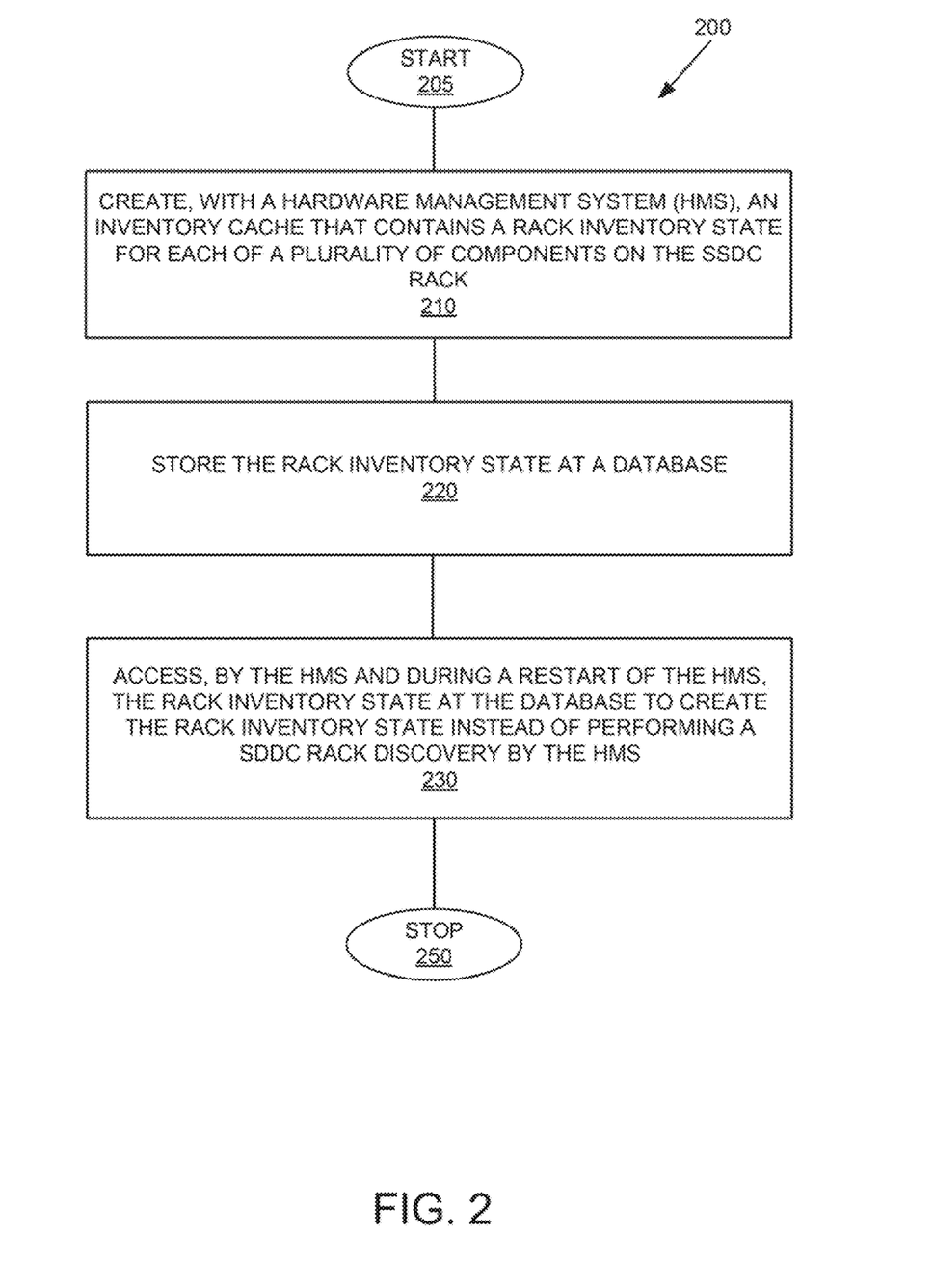
FIG. 2 depicts a flow chart of a method for a quick discovery of components of a SDDC rack, according to one embodiment.

FIG. 2 depicts a flow chart 200 of a method for a quick discovery of components of a software-defined data center (SDDC) rack, according to one embodiment.

At 205, the method begins.

At 210, one embodiment creates, with a hardware management system (HMS), an inventory cache that contains a rack inventory state for each of a plurality of components on the SDDC rack.

For example, one embodiment creates the rack inventory state by performing, with the HMS, the SDDC rack 100 discovery to obtain a rack inventory and state for each of the plurality of components on the SDDC rack. For example, in FIG. 1, the rack inventory and state would include a server 132 and its state and a switch 134 and its state. HMS 125 would then use the results from the SDDC rack discovery to create the inventory cache. For example, server/switch object cache 126 would contain the rack inventory state for each of the plurality of components (e.g., server 132 and switch 134) on the SDDC rack 100.

In one embodiment, the rack inventory is the resultant after the components of SDDC rack 100 have been successfully imaged. It is a collection of state and status information that can include access information for the imaged components such as connection protocol, IP address, and username and password and generates an inventory file. In one embodiment, the rack inventory file is transferred from server/switch object cache 126 to PRM 105.

At 220, the rack inventory state is stored at database 120. For example, PRM 105 is in communication with HMS 125 via PRM HMS component 113 which would receive the inventory file from server/switch object cache 126. PRM HMS component 113 would pass the inventory file to PRM database component 112 which will store the rack inventory state at the database 120.

To ensure that the rack inventory stored in database 120 is up to date, in one embodiment HMS 125 will periodically query a hardware sensor and state, e.g., a sensor error log, for any changes that may have occurred with respect to one or more of the plurality of components on the SDDC rack. The periodic query may be user defined or factory defaults and may be an hourly, daily, weekly or monthly occurrence. Moreover, in one embodiment, the hardware sensor or sensor error log may provide an update of information to HMS 125 when a component or component state changes. As such, the determination that an inventory change has occurred may be pushed or pulled to HMS 125. For example HMS 125 would utilize server plugin 127 to communicate with each server on the SDDC rack 100 and utilize switch plugin 128 to communicate with each switch on the SDDC rack 100.

When HMS 125 determines that a change has been found, such as by the hardware sensor and state finding a change, HMS 125 will update the rack inventory state stored at server/switch object cache 126. In addition, the information will be passed to PRM 105 to be stored in database 120. In one embodiment, the rack inventory state information is time stamped and more than one rack inventory state information may be stored at database 120. Thus, the rack inventory state is not just stored, but it is also maintained.

In one embodiment, along with rack inventory, a separate hash based inventory is also created that is a subset of rack inventory, e.g., it is kind of an inventory of all distinct servers. It is also used and queried upon by HMS to inventory any new rack or even the current rack.

At 230, one embodiment accesses, by HMS 125 and during a restart of HMS 125, the rack inventory state at database 120 to create the rack inventory state instead of performing a SDDC rack 100 discovery by HMS 125. In general, HMS 125 may be restarted due to updates, maintenance, new releases, e.g., a patch, power outages, or the like.

For example, during restart of HMS 125, instead of HMS 125 performing a time consuming rack discovery to determine the rack inventory state, HMS 125 will query PRM 105 for a copy of the inventory state information stored in database 120. For example, PRM database component 112 will retrieve the latest inventory state information from database 120 and provide it to PRM HMS component 113 which will pass the information to server/switch object cache 126 which will use the information to create its inventory.

After receiving the inventory state information at server/switch object cache 126, HMS 125 will query each server and switch sensor and state to determine if any changes have occurred for each of the plurality of components on the SDDC rack. In one embodiment, this query includes checking the sensor error log for any errors. If the server/switches sensor and state find a change, e.g., if it is determined that there is a state or sensor reading that is not in line with the information stored in server/switch object cache 126, the out-of-line component will be inventoried again thereby triggering an update of the rack inventory state. In other words, the inventory state information received from database 120 will be revalidated.

In so doing, the start-up to operational time for the HMS 125 will be significantly reduced as the entire inventory will not need to be taken during a restart. Instead, previously stored inventory state information will be received by HMS 125 and then will only need to be confirmed. Thus, the time to operation will be reduced to the time needed to confirm the previously stored inventory state information plus any time needed to update the inventory state information based on changes to the rack inventory state, such as those found in the server error log.

At 250, the method ends.

Quick Multi-Rack Inventory

Figure 3:
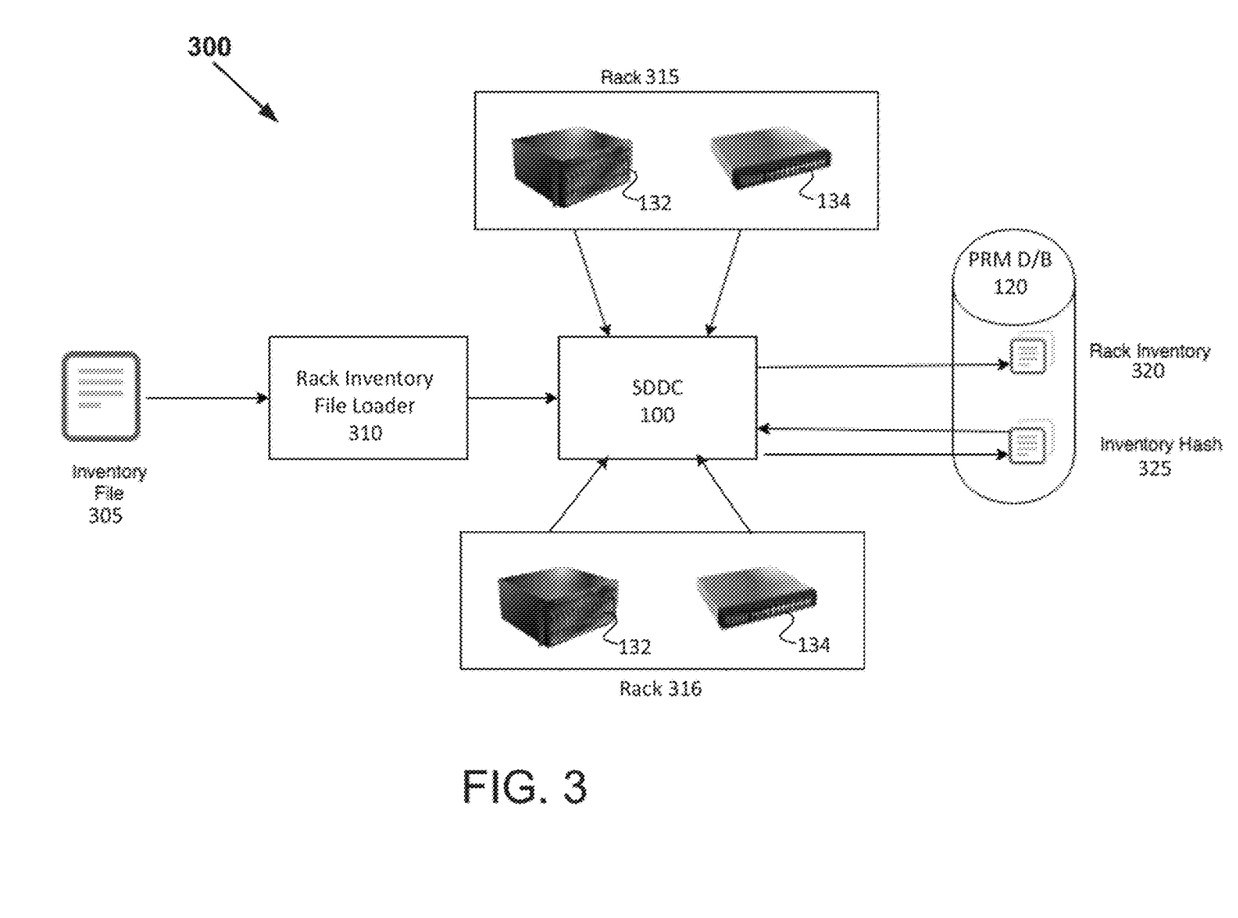
FIG. 3 depicts a block diagram of a SDDC rack, according to one embodiment.

With reference now to FIG. 3, a block diagram 300 of a SDDC multiple rack quick hardware inventory is shown in accordance with an embodiment. Diagram 300 includes an inventory file 305, a rack inventory file loader 310, SDDC 100, rack 315 that includes server 132 and switch 134, and PRM database 120. SDDC 100, rack 315 that includes server 132 and switch 134, and PRM database 120 are all described in detail previously herein. With the one exception that PRM database 120 of FIG. 3 includes a rack inventory 320 and an inventory hash 325 which may be stored on a single database or stored on different databases.

Inventory file 305 is a file that includes the description of each of the components found in a given rack such as rack 315, rack 316, or the like. In one embodiment, inventory file 305 is an imaging of the components of the rack. For example, at time of the rack 315 build at a factory, the factory will image the rack to provide a layout of the components, e.g., the node attributes, of the rack. Rack inventory file loader 310 provides information about the rack, e.g., rack 315 to the SDDC 100 and more specifically to HMS 125. The inventory file 305 is then stored in the rack inventory 320 database, which is in one embodiment, found in PRM database 120.

Figure 4:
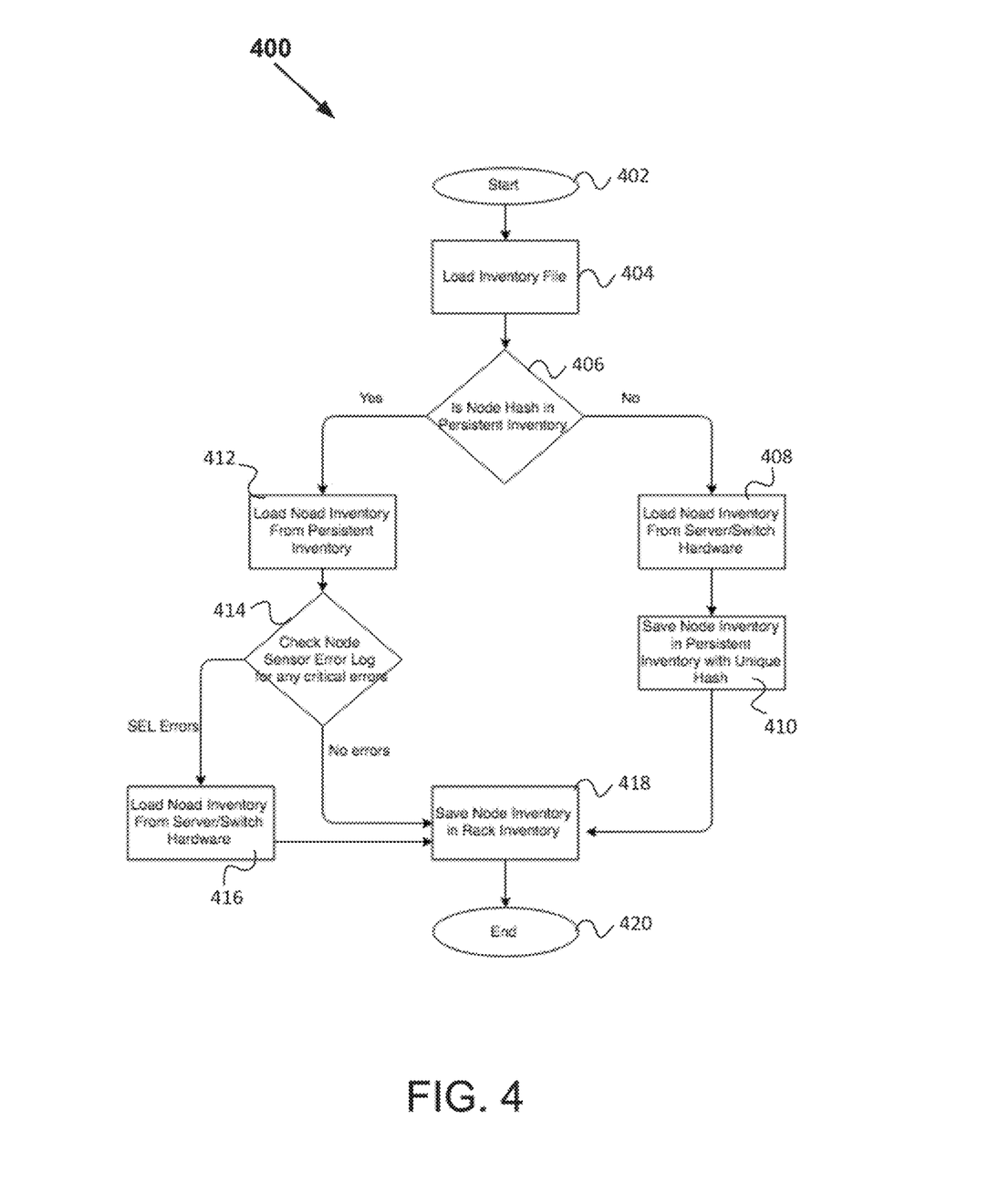
FIG. 4 depicts a flow chart of a method for a SDDC multiple rack quick hardware inventory, according to one embodiment.

The inventory hash 325 database provides a hashed version of the inventory file 305 for a given rack. Thus, as discussed in flowchart 400, a given rack 315 will have an inventory file 305 that will correlate to the given set of node attributes or components of rack 315. Similarly, that inventory file 315 will have a certain inventory hash 325.

In general, building the inventory hash database 325 is done by performing a server hash and a switch hash for each rack inventory 320. For each different rack inventory 320 a different inventory hash 325 will be generated. In other words, a given inventory hash 325 will be correlated to the rack inventory 320 from which the hash was initially made. After the inventory hash 325 database is built up, when SDDC 100 and more specifically HMS 125 receives a rack inventory or imaging of a rack's attributes, instead of performing an inventory of the rack, HMS 125 can perform a bash on the imaging. The resultant rack inventory hash can then be compared to the different inventory hash 325 that are stored in database 120. If a matching inventory hash 325 is found, then HMS 125 can look for the rack inventory 320 that correlates to the found inventory hash 325 and load the rack inventory without having to perform a discovery. Thus significantly reducing discovery and mapping. Moreover, this time savings is even more significant as additional racks are needed to be inventoried, e.g., in a multi rack environment.

To build the hash database, one embodiment generates a server hash based on the imaging of one or more node attributes for the components of the rack. In general, the server hash is created based on node attributes such as manufacturer, model, firmware, operating system (OS) name, OS vendor, or the like. In addition, the components used for the server hash can include, but is not limited to, a storage device, a memory, a processor, a storage controller, a power unit, an Ethernet controller, or the like.

An example of the server hash is shown below, although the server hash could be expanded or contracted. For example, the power unit is not shown in the below hash.

```
{
Manufacturer
Model
Firmware
OS Name
OS Vendor
    List/Array of Storage
    {
        Manuacturer
        Type
        Model
        Size
        Firmware
        Slot#
    }
    List/Array of DIMM
    {
        Manufacturer
        Model
        Type
        Size
    }
    List/Array of CPU
    {
        Manufacturer
        Model
        Speed
        Firmware
```

```
        }
        List/Array of StorageController
        {
            Manufacturer
            Model
            DevicesConnected
            Driver
            Firmware
        }
        List/Array of EthernetController
        {
            Manufacturer
            Model
            Firmware
            Speed
            List/Array of Ports
            {
                portStatus
                portName
            }
        }
    }
```

Further, one embodiment generates a switch hash based on the imaging of one or more node attributes for the components of the rack. An example of the switch hash is shown below, although the switch hash could be expanded or contracted. For example, a different hash might include might include port configs like vlan, lag, and the like.

```
{
    Manufacturer
    Model
    Firmware
    OS Name
    OS Vendor
    SwitchType
        List/Array of Ports
        {
            portStatus
            portName
            portSpeed
        }
}
```

An inventory hash 325 is then generated based on the server hash and the switch hash. For example,

```
            Server
            {
                id
                hash
                BMC_IP
                DATA_PORT_IP
                BMC_CREDENTIALS
                OS_CREDENTIALS
            }
```

A persistent rack data inventory, or rack inventory 320, for the components of the rack from the imaging is then correlated with the inventory hash 325. For example,

| ID | HASH(Unique) | Node-Inventory | Node_Type |
|----|---|---|---|
| 1 | 9e47104a488fed7e17b49263b1933c5e | Inventory_1 | Server |
| 2 | 879gdh4a98832 64887nc9263732648hjs | Inventory_2 | Switch | and

| Node_Inventory_ID | Inventory_Data |
|---|---|
| Inventory_1 | Server Data |
| Inventory_2 | Switch Data |

One embodiment stores the persistent rack inventory 320 and the inventory hash 325 in a database 120.

With reference now to FIG. 4, a method for a SDDC multiple rack quick hardware inventory is shown in accordance with an embodiment.

At 402 the method starts.

At 404, one embodiment loads the inventory file 305. For example, receiving, at a hardware management server (HMS), an imaging of a first rack 315.

At 406 one embodiment performs, by the HMS, a node hash of attributes of the imaging of the first rack 315. Once the node hash is complete, HMS 125 checks hash database, e.g., the inventory hash 325, for an inventory hash that matches the node hash of the first rack 315.

At 408, if there is no matching node hash in the inventory hash 325, then the rack discovery and inventory is performed on rack 315. However, in one embodiment where a rack has multiple server and switch nodes which may be of different make and model. A hash lookup for each of the nodes can be performed and any of the nodes that do match with the hash will not be inventoried, but will be treated according to process steps 412-416. For the remaining nodes that did not have a matching hash, HMS will trigger discovery update the rack inventory and add a new node in hash inventory. In addition, although a rack is used in the discussion, it is just one example of a collection of nodes for which HMS is asked to manage and would be, therefore, responsible to discover and inventory.

At 410, once the rack discovery and inventory is performed on rack 315, the node inventory is saved to the persistent inventory, e.g., to rack inventory 320 at database 120. In addition, a hash of the inventory of rack 315 is performed to generate an inventory hash 325 which is also stored in database 120 and correlated with the rack inventory 320.

At 412 if a match is found, one embodiment loads, by the HMS and into the server/switch object cache, a rack inventory 320 from the persistent rack data inventory instead of performing a discovery and inventory of the first rack 315. As discussed above, it is not a requirement that the match be found for every node in the managed system. The technology is well suited for matching one or more nodes out of the entire collection of managed nodes and reducing the discovery and inventory time for just those matching nodes.

For example, assume a match can be found for only 10 nodes in a full rack of 24 nodes. In this case, HMS will not perform inventory collection for the 10 matched nodes, but will just do the sensor error log (SEL) check as discussed at 414 for the 10 nodes. For the remaining 14 nodes which are not matched with the hash, HMS will trigger discovery, update the rack inventory, and add a new node in the hash inventory.

In one embodiment, in case the process is sequenced only one node will be inventoried first, and both rack and hash inventory will be updated. Then, before triggering the inventory for another node, a hash check will be performed as the hash inventory might have changed. For example, the hash inventory could be part of a centralized DB that receives updates from multiple sources. As such, during the discovery and inventory of the one node, the database may have received new hash inventories that would be useful for one or more of the remaining 14 nodes in the example case.

At 414 one embodiment checks a sensor error log of the first rack 315 for any errors as described in detail in flowchart 200.

If any errors are found, at 416 one embodiment modifies the rack inventory based on the errors in the sensor error log, again as described in detail in flowchart 200.

If no errors are found at 414, or once the rack inventory is modified at 416, at 418 one embodiment saves the rack inventory into server switch object cache 126.

One embodiment repeats the hardware inventory process for each additional rack, e.g., rack 316, etc.

At 420 the method ends.

In addition, there can be more than one node initial state in a distributed database, and a node from any rack can be matched against the various other node initial states. Further, any new node whose hash is not found can be inventoried and saved in database 120, thereby making the system self-learning and speed up inventory creation for other similar nodes.

Moreover, in a homogeneous rack HMS 125 would need to inventory only one node (incase hash is not available) and just check for the hash on other nodes. In contrast, in a heterogeneous rack HMS 125 would need to inventory only those nodes whose hash is not available. Additionally, in one embodiment, such as a multi-rack scenario where all racks have similar servers and components, only one node needs to be inventoried.

For example, in a homogenous rack, one embodiment generates a server hash based on the imaging of one or more node attributes for only one server component of the rack. Similarly, a switch hash is generated based on the imaging of one or more node attributes for only one switch component of the rack. The homogenous inventory hash for the homogenous rack is then generated based on the server hash and the switch hash. A persistent homogenous rack data inventory for the components of the rack from the imaging is then correlated with the homogenous inventory hash. The homogenous persistent rack data inventory and the homogenous inventory hash are then stored in database 120.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of computer readable instructions (e.g., software program) that reside within non-transitory computer readable storage memory of a computer system and are executed by the hardware processor of the computer system or physical computer. When executed, the instructions cause a computer system (physical computer) to implement the functionality of various embodiments of the present invention. For example, the instructions can be executed by a central processing unit associated with the computer system (physical computer). A central processing unit is an example of a hardware processor. According to one embodiment, the non-transitory computer readable storage medium is tangible. The non-transitory computer readable storage medium is hardware memory.

Unless otherwise specified, one or more of the various embodiments described in the context of FIGS. 1-2 can be implemented as hardware, such as circuitry, firmware, or computer readable instructions that are stored on non-transitory computer readable storage medium. The computer readable instructions of the various embodiments described in the context of FIGS. 1-2 can be executed by a hardware processor, such as central processing unit, to cause a computer system to implement the functionality of various embodiments. For example, according to one embodiment, the operations of the flowcharts depicted in FIG. 2 are implemented with computer readable instructions that are stored on computer readable storage medium that can be tangible or non-transitory or a combination thereof.

Example Computer System Environment

Figure 5:
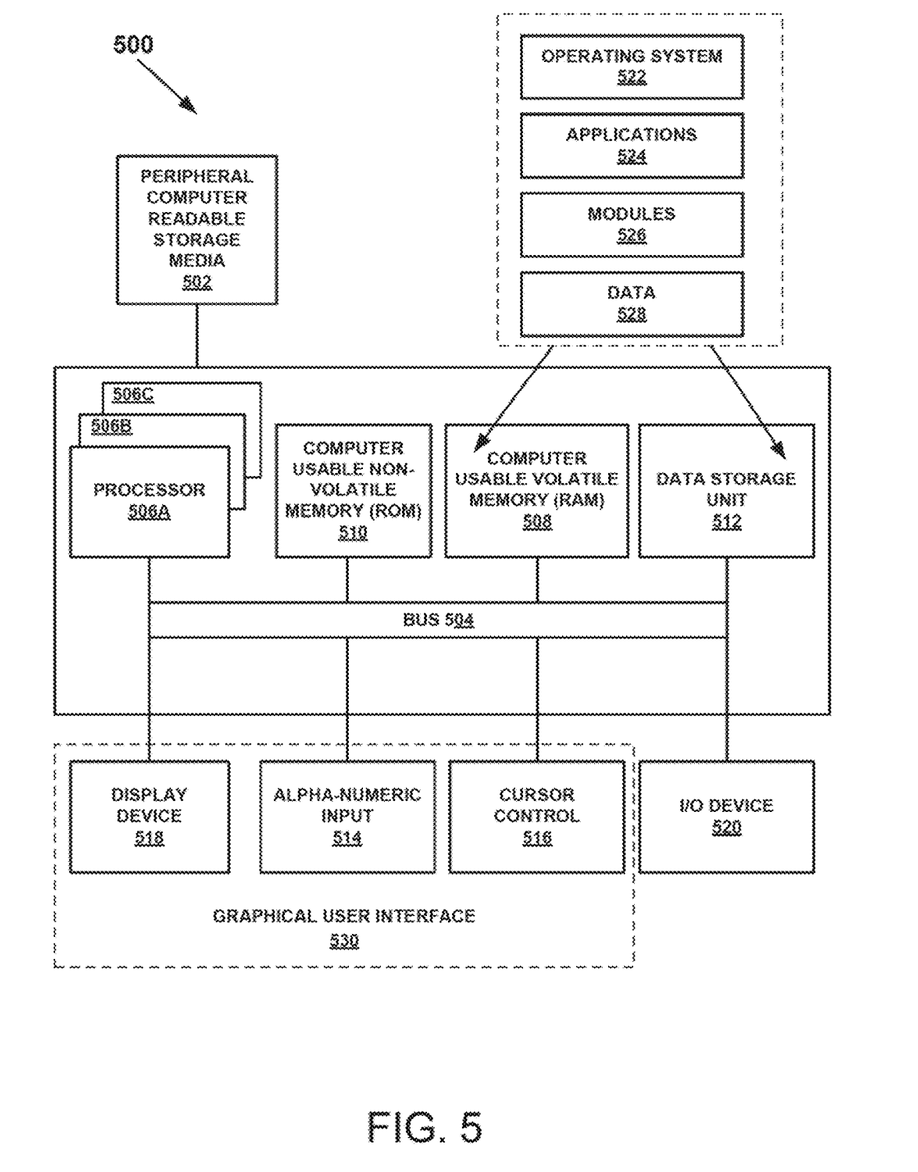
FIG. 5 depicts a block diagram of a computer system, according to one embodiment.

With reference now to FIG. 5, all or portions of some embodiments described herein are composed of computer-readable and computer-executable instructions that reside, for example, in computer-usable/computer-readable storage media of a computer system. That is, FIG. 5 illustrates one example of a type of computer (computer system 500) that can be used in accordance with or to implement various embodiments which are discussed herein. It is appreciated that computer system 500 of FIG. 5 is only an example and that embodiments as described herein can operate on or within a number of different computer systems including, but not limited to, general purpose networked computer systems, embedded computer systems, routers, switches, server devices, client devices, various intermediate devices/nodes, stand-alone computer systems, media centers, hand-held computer systems, multi-media devices, virtual machines, virtualization management servers, and the like. Computer system 500 of FIG. 5 is well adapted to having peripheral tangible computer-readable storage media 502 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 500 of FIG. 5 includes an address/data bus 504 for communicating information, and a processor 506A coupled with bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g., random access memory (RAM), coupled with bus 504 for storing information and instructions for processors 506A, 506B, and 506C. System 500 also includes computer usable non-volatile memory 510, e.g., read only memory (ROM), coupled with bus 504 for storing static information and instructions for processors 506A, 506B, and 506C. Also present in system 500 is a data storage unit 512 (e.g., a magnetic or optical disc and disc drive) coupled with bus 504 for storing information and instructions. System 500 also includes an alphanumeric input device 514 including alphanumeric and function keys coupled with bus 504 for communicating information and command selections to processor 506A or processors 506A, 506B, and 506C. System 500 also includes an cursor control device 516 coupled with bus 504 for communicating user input information and command selections to processor 506A or processors 506A, 506B, and 506C. In one embodiment, system 500 also includes a display device 518 coupled with bus 504 for displaying information.

Referring still to FIG. 5, display device 518 of FIG. 5 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 516 allows the computer user to dynamically signal the movement of a visible symbol (cursor) on a display screen of display device 518 and indicate user selections of selectable items displayed on display device 518. Many implementations of cursor control device 516 are known in the art including a trackball, mouse, touch pad, touch screen, joystick or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. System 500 is also well suited to having a cursor directed by other means such as, for example, voice commands. In various embodiments, alphanumeric input device 514, cursor control device 516, and display device 518, or any combination thereof (e.g., user interface selection devices), may collectively operate to provide a graphical user interface (GUI) 530 under the direction of a processor (e.g., processor 506A or processors 506A, 506B, and 506C). GUI 530 allows user to interact with system 500 through graphical representations presented on display device 518 by interacting with alpha-numeric input device 514 and/or cursor control device 516.

System 500 also includes an I/O device 520 for coupling system 500 with external entities. For example, in one embodiment, I/O device 520 is a modem for enabling wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one or some combination of computer usable volatile memory 508 (e.g., RAM), computer usable non-volatile memory 510 (e.g., ROM), and data storage unit 512. In some embodiments, all or portions of various embodiments described herein are stored, for example, as an application 524 and/or module 526 in memory locations within RAM 508, computer-readable storage media within data storage unit 512, peripheral computer-readable storage media 502, and/or other tangible computer-readable storage media.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

Although various illustrations were described in the context of VMware® products, such as HMS, PRM, and SDDC rack, various embodiments are well suited for other types of products where, for example, a management system is managing a computing rack that is other than a SDDC rack.

According to various embodiments, the quick hardware inventory of a SDDC multi-rack significantly reduces the discovery time of the components of one or a plurality of SDDC racks. Therefore, the state of a computer system is transformed at least by the utilization of the quick hardware inventory option, according to one embodiment. Moreover, the overall operation of the SDDC multiple racks are significantly improved by the utilization of the quick hardware inventory described herein.

Although specific operations are disclosed in flowcharts 200 and 400, such operations are exemplary. That is, embodiments of the present invention are well suited to performing various other operations or variations of the operations recited in flowcharts 200 and 400. It is appreciated that the operations in flowcharts 200 and 400 may be performed in an order different than presented, and that not all of the operations in flowcharts 200 and 400 may be performed.

The operations depicted in FIGS. 2 and 4 can be implemented as computer readable instructions, hardware or firmware. According to one embodiment, a computer system 500 can perform one or more of the operations depicted in FIGS. 2 and 4. According to one embodiment, one or more of the operations depicted in FIGS. 2 and 4 may be performed by another computer system. The other system can include hardware, such as a central processing unit, for executing computer readable instructions.

What is claimed is:

1. A method for quick hardware inventory of a software-defined data center (SDDC) multi-rack, the method comprising:
   receiving, at a hardware management server (HMS), an imaging of a first rack of said SDDC multi-rack;
   performing, by the HMS, a node hash of node attributes for components in the imaging of the first rack of said SDDC multi-rack;
   checking, by the HMS, a hash database for an inventory hash that matches the node hash of the first rack of said SDDC multi-rack;
   if a match is found, loading, by the HMS, a rack inventory from a persistent rack data inventory correlated with the inventory hash instead of performing a discovery and inventory of the first rack of said SDDC multi-rack;
   checking, by the HMS, a sensor error log of said first rack for any errors;
   modifying, by the HMS, the rack inventory based on any errors in the sensor error log;
   saving, by the HMS, the rack inventory into a server switch object cache; and
   repeating, by the HMS, the quick hardware inventory for each additional rack of said SDDC multi-rack.

2. The method as recited by claim 1, further comprising:
building the hash database comprising:
generating a server hash based on an imaging of one or more node attributes for the components of the rack;
generating a switch hash based on the imaging of one or more node attributes for the components of the rack;
generating a inventory hash based on the server hash and the switch hash;
correlating a persistent rack data inventory for the components of the rack from the imaging with the inventory hash; and
storing the persistent rack data inventory and the inventory hash in a database.

3. The method as recited by claim 2, further comprising:
selecting the one or more node attributes for the server hash from the group consisting of a manufacturer, a model, a firmware, an operating system (OS) name, or an OS vendor.

4. The method as recited by claim 2, further comprising:
selecting the components for the server hash from the group consisting of a storage device, a memory, a processor, a storage controller, a power unit or an Ethernet controller.

5. The method as recited by claim 2, further comprising:
selecting the one or more node attributes for the switch hash from the group consisting of a manufacturer, a model, a firmware, an operating system (OS) name, an OS vendor, or a switch type.

6. The method as recited by claim 1, further comprising:
in a homogenous rack,
generating a server hash based on an imaging of one or more node attributes for only one server component of the rack;
generating a switch hash based on the imaging of one or more node attributes for only one switch component of the rack;
generating a homogenous inventory hash for the homogenous rack based on the server hash and the switch hash;
correlating a persistent homogenous rack data inventory for the components of the rack from the imaging with the homogenous inventory hash; and
storing the homogenous persistent rack data inventory and the homogenous inventory hash in a database.

7. The method as recited by claim 1, further comprising:
receiving the imaging of the first rack from a factory site that built the first rack.

8. A non-transitory computer-readable medium storing instructions, the instructions comprising:
one or more instructions that, when executed by one or more processors of a device, cause the one or more processors to:
receive an imaging of a first SDDC rack;
perform a node hash of node attributes for components in the imaging of the first SDDC rack;
check a hash database for a persistent rack data inventory hash that matches the node hash of the first SDDC rack;
if a match is found, load a rack inventory from the persistent rack data inventory instead of performing a discovery and inventory of the first SDDC rack;
check a sensor error log of said first SDDC rack for any errors;
modify the rack inventory based on any errors in the sensor error log;
save the rack inventory into a server switch object cache; and
repeat the process for each additional SDDC rack.

9. The non-transitory computer-readable medium of claim 8, further comprising:
one or more instructions that, when executed by one or more processors of a device, cause the one or more processors to:
build the hash database comprising:
generating a server hash based on an imaging of one or more node attributes for the components of the SDDC rack;
generating a switch hash based on the imaging of one or more node attributes for the components of the SDDC rack;
generating a inventory hash based on the server hash and the switch hash;
correlating a persistent rack data inventory for the components of the SDDC rack from the imaging with the inventory hash; and
storing the persistent rack data inventory and the inventory hash in a database.

10. The non-transitory computer-readable medium of claim 9, where the one or more node attributes for the server hash is selected from the group consisting of a manufacturer, a model, a firmware, an operating system (OS) name, or an OS vendor.

11. The non-transitory computer-readable medium of claim 9, where the components for the server hash are selected from the group consisting of a storage device, a memory, a processor, a storage controller, a power unit or an Ethernet controller.

12. The non-transitory computer-readable medium of claim 9, where the one or more node attributes for the switch hash is selected from the group consisting of a manufacturer, a model, a firmware, an operating system (OS) name, an OS vendor, or a switch type.

13. The non-transitory computer-readable medium of claim 8, wherein the one or more instructions that, when executed by one or more processors of a device in a homogenous rack, cause the one or more processors to:
generate a server hash based on an imaging of one or more node attributes for only one server component of the SDDC rack;
generate a switch hash based on the imaging of one or more node attributes for only one switch component of the SDDC rack;
generating a homogenous inventory hash for the homogenous rack based on the server hash and the switch hash;
correlating a persistent homogenous rack data inventory for the components of the rack from the imaging with the homogenous inventory hash; and
storing the homogenous persistent rack data inventory and the homogenous inventory hash in a database.

14. The non-transitory computer-readable medium of claim 8, further comprising:
one or more instructions that, when executed by one or more processors of a device, cause the one or more processors to:
receive the image of the first SDDC rack from a factory site that built the first SDDC rack.

15. A non-transitory computer readable storage medium having computer readable program code embedded therein that when executed causes a computing system to perform a method for quick hardware inventory of a software-defined data center (SDDC) multi-rack, the method comprising:

receiving, at a hardware management server (HMS), an imaging of a first SDDC rack;
performing, by the HMS, a node hash of node attributes for components in the imaging of the first SDDC rack;
checking, by the HMS, a hash database for a persistent rack data inventory hash that matches the node hash of the first SDDC rack;
if a match is found, loading, by the HMS, a rack inventory from the persistent rack data inventory instead of performing a discovery and inventory of the first SDDC rack;
checking, by the HMS, a sensor error log of said first SDDC rack for any errors;
modifying, by the HMS, the rack inventory based on any errors in the sensor error log;
saving, by the HMS, the rack inventory into a server switch object cache; and
repeating, by the HMS, the quick hardware inventory for each additional SDDC rack.

16. The non-transitory computer readable storage medium as recited by claim 15, further comprising:
building the hash database comprising:
generating a server hash based on an imaging of one or more node attributes for the components of the SDDC rack;
generating a switch hash based on the imaging of one or more node attributes for the components of the SDDC rack;
generating a inventory hash based on the server hash and the switch hash;
correlating a persistent rack data inventory for the components of the SDDC rack from the imaging with the inventory hash; and
storing the persistent rack data inventory and the inventory hash in a database.

17. The non-transitory computer readable storage medium as recited by claim 16, further comprising:
selecting the one or more node attributes for the server hash from the group consisting of a manufacturer, a model, a firmware, an operating system (OS) name, or an OS vendor; and
selecting the components for the server hash from the group consisting of a storage device, a memory, a processor, a storage controller, a power unit or an Ethernet controller.

18. The non-transitory computer readable storage medium as recited by claim 16, further comprising:
selecting the one or more node attributes for the switch hash from the group consisting of a manufacturer, a model, a firmware, an operating system (OS) name, an OS vendor, or a switch type.

19. The non-transitory computer readable storage medium as recited by claim 15, further comprising:
in a homogenous rack,
generating a server hash based on an imaging of one or more node attributes for only one server component of the SDDC rack;
generating a switch hash based on the imaging of one or more node attributes for only one switch component of the SDDC rack;
generating a homogenous inventory hash for the homogenous rack based on the server hash and the switch hash;
correlating a persistent homogenous rack data inventory for the components of the rack from the imaging with the homogenous inventory hash; and
storing the homogenous persistent rack data inventory and the homogenous inventory hash in a database.

20. The non-transitory computer readable storage medium as recited by claim 15, further comprising:
receiving the imaging of the first SDDC rack from a factory site that built the SDDC rack.

* * * * *